United States Patent
Wada et al.

(10) Patent No.: US 10,518,640 B2
(45) Date of Patent: Dec. 31, 2019

(54) BATTERY REMAINING CAPACITY DISPLAY DEVICE, BATTERY SYSTEM, AND BATTERY REMAINING CAPACITY DISPLAY METHOD

(71) Applicant: OMRON CORPORATION, Kyoto-shi, Kyoto (JP)

(72) Inventors: Junichi Wada, Tokyo (JP); Hiromasa Takatsuka, Tokyo (JP); Kazuki Kasai, Tokyo (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/758,748

(22) PCT Filed: Nov. 2, 2016

(86) PCT No.: PCT/JP2016/082622
§ 371 (c)(1),
(2) Date: Mar. 9, 2018

(87) PCT Pub. No.: WO2017/086168
PCT Pub. Date: May 26, 2017

(65) Prior Publication Data
US 2019/0039474 A1 Feb. 7, 2019

(30) Foreign Application Priority Data
Nov. 17, 2015 (JP) .................. 2015-224348

(51) Int. Cl.
*B60L 11/18* (2006.01)
*B60K 35/00* (2006.01)
(Continued)

(52) U.S. Cl.
CPC .............. *B60K 35/00* (2013.01); *B60L 58/10* (2019.02); *H01M 10/488* (2013.01);
(Continued)

(58) Field of Classification Search
CPC . B60K 35/00; B60K 2370/52; H01M 10/488; H02J 7/0021; B60Y 2200/91;
(Continued)

(56) References Cited

U.S. PATENT DOCUMENTS 5,521,443 A    5/1996  Imura et al.
5,549,984 A *  8/1996  Dougherty ........ H01M 10/4207
                                                  307/10.7

(Continued)

FOREIGN PATENT DOCUMENTS

EP    2762907 A1    8/2014
JP    H11-102732 A  4/1999
(Continued)

OTHER PUBLICATIONS

An English translation of the International Search Report of PCT/JP2016/082622 dated Dec. 20, 2016.
(Continued)

*Primary Examiner* — An T Nguyen
(74) *Attorney, Agent, or Firm* — Metrolex IP Law Group, PLLC

(57) ABSTRACT

A battery remaining capacity display device (30) comprises remaining capacity calculators (32A, 32B), a combined remaining capacity calculator (33), a display controller (35), a display instruction component (36), and a display component (34). The display controller (35) controls the display of the individual remaining capacities and the display of the total remaining capacity. The display instruction component (36) instructs the display controller (35) to display or not to display. The display component (34) displays the individual remaining capacities and the total remaining capacity. The display controller (35) performs control so that the individual remaining capacities and/or the combined remaining capacity is displayed on the display distribution (34) accord- (Continued)

ing to an instruction from the display instruction component (36).

6 Claims, 6 Drawing Sheets

(51) Int. Cl.
| | |
|---|---|
| *B60L 58/10* | (2019.01) |
| *H01M 10/48* | (2006.01) |
| *H02J 7/00* | (2006.01) |
| *B62M 6/40* | (2010.01) |
| *B62M 6/90* | (2010.01) |
| *G06F 3/14* | (2006.01) |
| *G09G 5/00* | (2006.01) |

(52) U.S. Cl.
CPC ........ *H02J 7/0021* (2013.01); *B60K 2370/52* (2019.05); *B60Y 2200/91* (2013.01); *B62M 6/40* (2013.01); *B62M 6/90* (2013.01); *G06F 3/14* (2013.01); *G09G 5/003* (2013.01); *G09G 2354/00* (2013.01); *G09G 2380/10* (2013.01)

(58) Field of Classification Search
CPC .. B62M 6/40; B62M 6/90; G06F 3/14; G09G 5/003; G09G 2354/00; G09G 2380/10; G01R 31/3606; G01R 31/3679; G01R 31/362; B60L 11/1822; B60L 58/10
See application file for complete search history.

(56) References Cited

U.S. PATENT DOCUMENTS

| | | | |
|---|---|---|---|
| 6,650,089 B1 | 11/2003 | Freeman et al. | |
| 2003/0169019 A1* | 9/2003 | Oosaki | H02J 7/0047 320/132 |
| 2006/0152196 A1 | 7/2006 | Matsumoto et al. | |
| 2007/0114971 A1 | 5/2007 | Uesaka et al. | |
| 2009/0132186 A1 | 5/2009 | Esnard et al. | |
| 2009/0279883 A1* | 11/2009 | Fujita | H01M 10/482 396/279 |
| 2009/0295336 A1* | 12/2009 | Yang | H01M 10/441 320/134 |
| 2009/0315359 A1 | 12/2009 | Suzuki et al. | |
| 2010/0222952 A1* | 9/2010 | Yamaguchi | B60K 6/28 701/22 |
| 2010/0318252 A1 | 12/2010 | Izumi | |
| 2011/0178745 A1* | 7/2011 | Kobayashi | G01R 31/3646 702/63 |
| 2012/0075090 A1* | 3/2012 | Satake | B60K 37/02 340/455 |
| 2012/0086405 A1 | 4/2012 | Shigemizu et al. | |
| 2012/0098500 A1 | 4/2012 | Vestama et al. | |
| 2013/0127687 A1 | 5/2013 | Yu | |
| 2013/0154569 A1* | 6/2013 | Endo | H02J 7/0014 320/128 |
| 2013/0200845 A1 | 8/2013 | Bito | |
| 2013/0200848 A1 | 8/2013 | Ozawa et al. | |
| 2013/0320989 A1* | 12/2013 | Inoue | G01R 31/3842 324/427 |
| 2014/0032141 A1 | 1/2014 | Subbotin et al. | |
| 2014/0095089 A1 | 4/2014 | Wu et al. | |
| 2014/0277887 A1* | 9/2014 | Slattery | B60L 1/003 701/22 |
| 2014/0316728 A1 | 10/2014 | Zhong et al. | |
| 2014/0347012 A1 | 11/2014 | Shim et al. | |
| 2015/0077126 A1 | 3/2015 | Wang et al. | |
| 2015/0119094 A1 | 4/2015 | Bartels et al. | |
| 2015/0123611 A1 | 5/2015 | Huang | |
| 2015/0191162 A1* | 7/2015 | Dao | H04Q 9/00 701/22 |
| 2015/0318724 A1* | 11/2015 | Brockman | H02J 7/0047 320/152 |
| 2015/0318725 A1* | 11/2015 | Brockman | H02J 7/0047 340/636.1 |
| 2015/0333544 A1* | 11/2015 | Toya | H01M 10/48 320/112 |
| 2016/0003917 A1 | 1/2016 | You et al. | |
| 2016/0181839 A1* | 6/2016 | Racine | H02J 7/0093 320/107 |
| 2017/0106760 A1* | 4/2017 | Wang | H01M 10/00 |
| 2017/0136914 A1* | 5/2017 | Drake | B60L 7/10 |
| 2017/0373355 A1* | 12/2017 | Kagawa | H01M 10/482 |
| 2018/0105063 A1* | 4/2018 | Wei | B60L 50/64 |
| 2019/0039474 A1* | 2/2019 | Wada | B60L 58/12 |

FOREIGN PATENT DOCUMENTS

| | | |
|---|---|---|
| JP | 2005-077332 A | 3/2005 |
| JP | 2009-201197 A | 9/2009 |
| JP | 2010-4666 A | 1/2010 |
| JP | 2011-176958 A | 9/2011 |
| JP | 2012-90436 A | 5/2012 |
| JP | 2012-159357 A | 8/2012 |
| JP | 2013-46512 A | 3/2013 |
| JP | 2013-154717 A | 8/2013 |
| JP | 2013-225951 A | 10/2013 |
| JP | 2014-190727 A | 10/2014 |
| JP | 2014-228534 A | 12/2014 |
| JP | 2014-233783 A | 12/2014 |
| JP | 2014-535038 A | 12/2014 |
| WO | 2010/140233 A1 | 12/2010 |
| WO | 2017/094432 A1 | 6/2017 |

OTHER PUBLICATIONS

An English translation of the Written Opinion of PCT/JP2016/082622 dated Dec. 20, 2016.
An English translation of the International Search Report of a related international application PCT/JP2016/082665 dated Jan. 17, 2017.
An English translation of the Written Opinion of a related international application PCT/JP2016/082665 dated Jan. 17, 2017.
The Verge: Gogoro's electric scooter of the future—CES 2015, URL:https://www.youtube.com/watch?time_continue=1&v=QafvGm9br4o (Retrieved from the Internet on Nov. 23, 2018), Jan. 5, 2015, p. 1-3, Relevance is indicated in the EESR issued on Dec. 3, 2018 in a counterpart European patent application.
The extended European search report (EESR) dated Dec. 3, 2018 in a counterpart European patent application.
The EESR dated Jul. 22, 2019 in a related European patent application.
An office action dated Aug. 6, 2019 in a counterpart Japanese patent application.
The U.S. Office Action dated Jun. 26, 2019 in a related U.S. Appl. No. 15/758,763.
Gogoro, "Gogoro—Introducing the world's first and only Smartscooter(TM)",www.gogoro.com/support, Retrieved from the Internet: URL:http://web.archive.org/web/20150910133644/http://www.gogoro.com/support (retrieved on Jul. 5, 2019), Sep. 10, 2015, XP055602868, Relevance is indicated in the EPOA dated Aug. 30, 2019 in a counterpart European patent application.
Office action dated Aug. 30, 2019 in a counterpart European patent application.
Office action dated Oct. 15, 2019 in a counterpart Japanese patent application.

* cited by examiner

BATTERY REMAINING CAPACITY DISPLAY DEVICE, BATTERY SYSTEM, AND BATTERY REMAINING CAPACITY DISPLAY METHOD

FIELD

The present invention relates to a battery remaining capacity display device, a battery system, and a battery remaining capacity display method.

BACKGROUND

A vehicle equipped with a plurality of batteries that can be connected in parallel has been proposed in the past (see, for example, Patent Literature 1).

The vehicle disclosed in Patent Literature 1 is configured so that a plurality of batteries can be disposed spaced apart in the width direction of the vehicle. The user removes or adds batteries according to the distance to be traveled.

Meanwhile, recent years have seen systems constructed in which batteries installed in a vehicle such as an electric motorcycle or an electric bicycle are used and then exchanged at a station where charged batteries are available.

CITATION LIST

Patent Literature

Patent Literature 1: JP-A 2010-4666

SUMMARY

However, the following problems may be encountered when the remaining capacity of a plurality of batteries that can be connected in parallel is displayed for the user as in Patent Literature 1.

Specifically, when displaying the remaining capacity of the batteries, it is conceivable that the remaining capacity of each of the batteries will simply be displayed, but in this case it is difficult for the user to determine how far can be traveled from the current location at the current remaining capacity.

It is an object of the present invention to provide a battery remaining capacity display device, a battery system, and a battery remaining capacity display method with which it is easy to grasp how far can be traveled.

Solution to Problem

The battery remaining capacity display device pertaining to the first invention comprises an individual remaining capacity calculator, a total remaining capacity calculator, a display controller, a display instruction component, and a display component. The individual remaining capacity calculator calculates the individual remaining capacities of a plurality of batteries that can be removably connected in parallel to a power consumption element. The total remaining capacity calculator calculates the total remaining capacity for a plurality of batteries on the basis of the individual remaining capacities calculated by the individual remaining capacity calculator. The display controller controls the display of the individual remaining capacities and the display of the total remaining capacity. The display instruction component instructs the display controller either to display or not to display. The display component displays the individual remaining capacities and the total remaining capacity. The display controller controls so that the individual remaining capacities and/or the total remaining capacity is displayed on the display component according to an instruction from the display instruction component.

Thus, the total remaining capacity is calculated from the individual remaining capacities of the plurality of batteries and this total remaining capacity is displayed, so that when the power consumption element is a moving body such as vehicle, for example, the user can easily tell how far can be traveled from the current location.

Also, displaying the individual remaining capacities of the plurality of batteries makes it easy for the user to know when a battery needs to be replaced.

Also, displaying a total for the battery unit as a percentage, for example, allows the user to check the percentage of the total remaining capacity versus the total charge, and to more intuitively grasp how far can be traveled.

Also, the individual remaining capacities may be displayed along with the total remaining capacity, for example, in which case, when exchanging batteries at a station, the user can easily grasp which of the plurality of batteries has a low remaining capacity. In addition, since the total remaining capacity is also displayed, the user can also intuitively grasp the how far can be traveled from the current location.

Also, the display can be switched between individual remaining capacities and total remaining capacity, for example.

The battery remaining capacity display device pertaining to the second invention is the battery remaining capacity display device pertaining to the first invention, wherein the display instruction component instructs the display controller to display the total remaining capacity on the display component during drive of the power consumption element, and to display the individual remaining capacities on the display component during battery exchange.

Consequently, when the power consumption element is a moving body such as vehicle, for example, the total of the remaining capacities can be displayed when the vehicle is traveling, and the individual remaining capacities can be displayed when the batteries are replaced at a station.

Therefore, the user can easily tell which batteries to replace at the station, and can also intuitively grasp how far can be traveled.

The battery remaining capacity display device pertaining to the third invention is the battery remaining capacity display device pertaining to the first invention, wherein the display instruction component instructs the display controller to switch the display of the individual remaining capacities and the display of the total remaining capacity on the basis of a user setting.

This makes it possible to switch between individual remaining capacity display and the total remaining capacity display based on the user setting.

The battery remaining capacity display device pertaining to the fourth invention is the battery remaining capacity display device pertaining to the first invention, further comprising an input component that accepts an operation from a user. The display instruction component instructs the display controller to switch the display of the individual remaining capacities and the display of the total remaining capacity on the basis of a user operation to the input component.

This makes it possible to switch between individual remaining capacities display and total remaining capacity display by the user input (direct operation).

The battery remaining capacity display device pertaining to the fifth invention is the battery remaining capacity display device pertaining to the first invention, wherein the power consumption element is an electric motorcycle, an electric bicycle, an electrically assisted bicycle, or an electric power tool.

Here, examples of the power consumption element include moving bodies (vehicles) such as an electric motorcycle and an electric bicycle. The power consumption element also includes power tools such as a drill.

This makes it possible to calculate the remaining capacity of each battery of the power consumption element in which a plurality of batteries are installed, and to display the total of these remaining capacities.

The battery system pertaining to the sixth invention comprises a plurality of batteries, an individual remaining capacity calculator, a total remaining capacity calculator, a display controller, a display instruction component, and a display component. The plurality of batteries can be connected in parallel and can be removably installed in a power consumption element. The individual remaining capacity calculator calculates the individual remaining capacities of the plurality of batteries. The total remaining capacity calculator calculates the total remaining capacity of the plurality of batteries based on the individual remaining capacities calculated by the individual remaining capacity calculator. The display controller controls the display of the individual remaining capacities and the display of the total remaining capacity. The display instruction component instructs the display controller to display or not to display. The display component displays the individual remaining capacities and the total remaining capacity. The display controller controls so that the individual remaining capacities and/or the total remaining capacity is displayed on the display component according to an instruction from the display instruction component.

This makes it possible to display the total remaining capacity, either along with the individual remaining capacities or separately from the individual remaining capacities, on the basis of the remaining capacity of each of the plurality of batteries.

The battery remaining capacity display method pertaining to the seventh invention comprises an individual remaining capacity calculation step, a total remaining capacity calculation step, a display instruction step, a display control step, and a display step. The individual remaining capacity calculation step involves calculating the individual remaining capacities of a plurality of batteries that can be connected in parallel and can be removably installed in a power consumption element. The total remaining capacity calculation step involves calculating the total remaining capacity of the plurality of batteries on the basis of the individual remaining capacities calculated in the individual remaining capacity calculating step. The display instruction step involves instructing whether to display or not to display the individual remaining capacities and the total remaining capacity. The display control step involves controlling the display of the individual remaining capacities and the display of the total remaining capacity according to an instruction from the display instruction step. The display step involves displaying the individual remaining capacities and/or the total remaining capacity on the basis of control performed in the display control step.

Thus, the total remaining capacity is calculated from the individual remaining capacities of the plurality of batteries, and this total remaining capacity is displayed, so when the power consumption element is a moving body such as a vehicle, for example, the user can easily tell how far can be traveled from the current location.

Also, displaying the individual remaining capacities of the plurality of batteries makes it easier for the user to tell which batteries need to be replaced.

Also, for example, the individual remaining capacities may be displayed along with the total remaining capacity, and when exchanging batteries at a station, the user can easily tell which of the plurality of batteries have a low remaining capacity. In addition, since the total remaining capacity is also displayed, the user can intuitively grasp how far can be traveled from the current location.

Also, for example, the display can be switched between the individual remaining capacities and the total remaining capacity.

Effects

The present invention provides a battery remaining capacity display device, a battery system, and a battery remaining capacity display method with which it is easy to grasp how far can be traveled.

DETAILED DESCRIPTION

The battery system, a battery remaining capacity display device, and battery remaining capacity display method pertaining to an embodiment of the present invention will now be described through reference to the drawings.

Embodiment 1

The battery system 1 according to the first embodiment of the present invention will be described.

1. Configuration 1-1. Battery System 1

Figure 1:
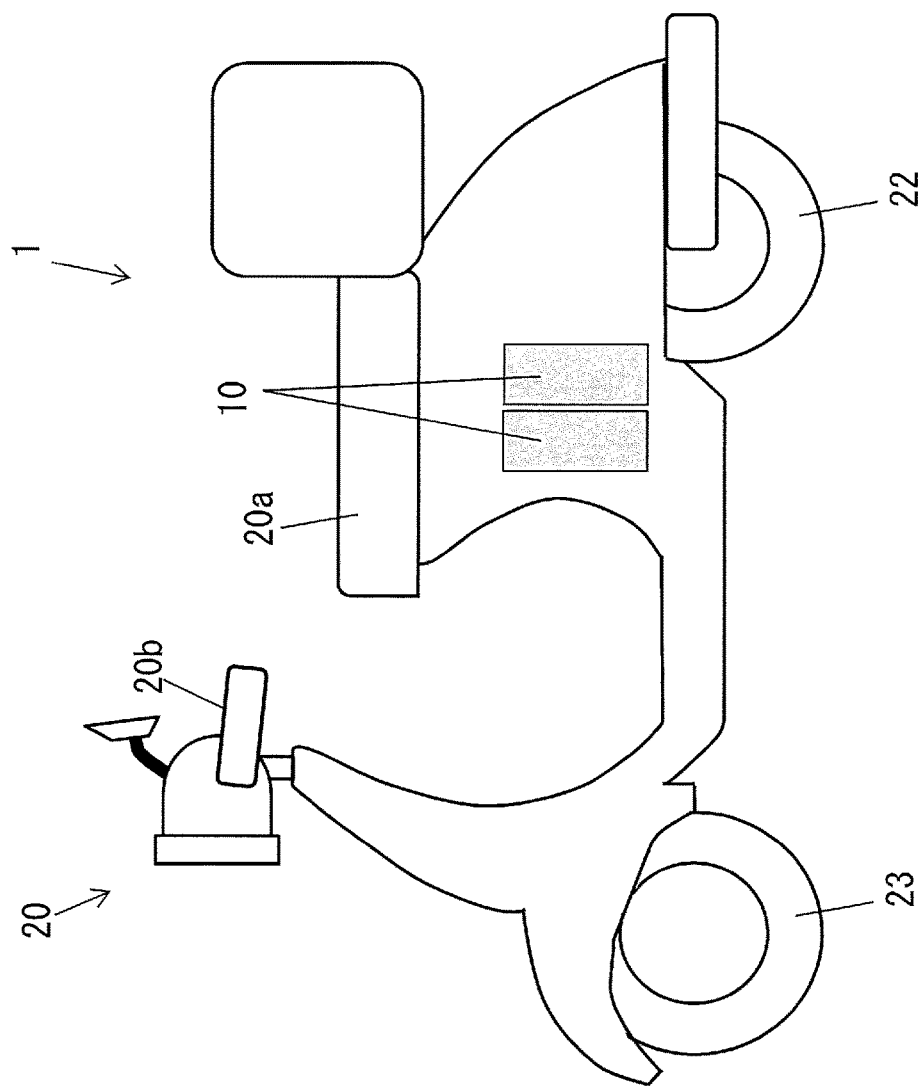
FIG. 1 is a diagram of a battery system in Embodiment 1 of the present invention, and a station where battery packs are exchanged.
Figure 1:
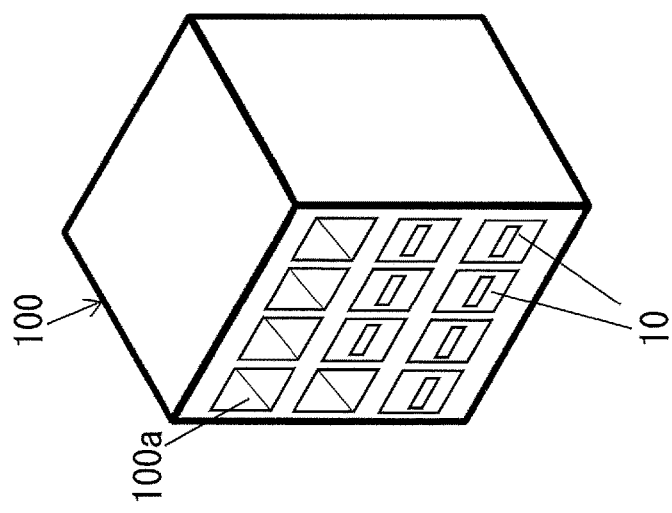

The battery system 1 in this embodiment is a system that supplies power to a vehicle 20, and comprises battery packs 10 and the vehicle 20, as shown in FIG. 1.

As shown in FIG. 1, two battery packs 10 are installed in the vehicle 20 (an electric motorcycle, etc.).

In the vehicle 20, power is supplied from the two battery packs 10 installed in the space below a seat 20a, and the rear wheel (drive wheel) 22 is rotationally driven, so that the vehicle can travel.

The vehicle 20 can make use of what is known as a battery swap, in which the battery packs 10 whose remaining capacity has been reduced by travel, natural discharge, or the like are replaced with charged battery packs 10 at a specific station 100. As shown in FIG. 1, the station 100 has receptacles 100a into which a plurality of batteries packs 10 are inserted. The battery packs 10 are disposed in these receptacles 100a. Stations 100 are set up at a plurality of locations such as gasoline stations.

1-2. Battery Pack 10

In order to supply power to the vehicle 20, in this embodiment two of the battery packs 10 are installed in the vehicle 20 in a manner that allows them to be replaced. Here, when distinguishing among the two battery packs 10, they will be called battery packs 10A and 10B.

Figure 2:
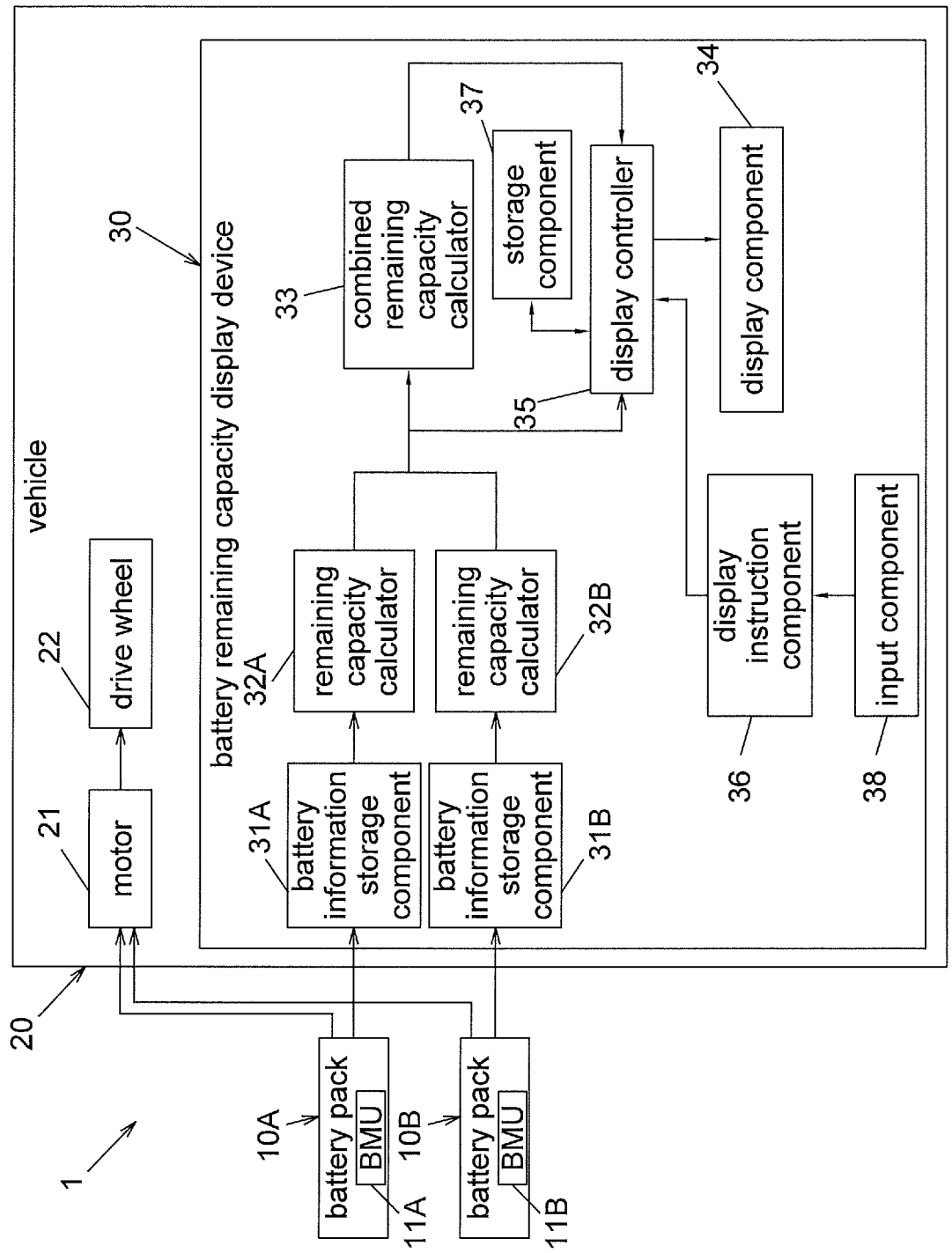
FIG. 2 is a block diagram of the configuration of the battery system in FIG. 1.

As shown in FIG. 2, the battery pack 10A has a BMU (battery management unit) 11A. The BMU 11A controls the voltage and current of the battery pack 10A. Similarly, the battery pack 10B has a BMU 11B, and the BMU 11B controls the voltage and current of the battery pack 10B.

The battery packs 10A and 10B store or release electric power. The two battery packs 10A and 10B are electrically connected in parallel in the vehicle 20. Therefore, even if just one of the two battery packs 10 is installed in the vehicle 20, power can still be supplied to the motor 21, and the vehicle 20 can travel.

1-3. Vehicle 20

The vehicle 20 is an electric motorcycle that travels when supplied with power from the two battery packs 10 installed under the seat 20a. As shown in FIG. 2, the vehicle 20 has the motor 21, the rear wheel (drive wheel) 22, a front wheel 23 (see FIG. 1), and a battery remaining capacity display device 30.

The motor 21 receives the power supplied from the battery packs 10 and transmits a rotational driving force to the axle of the rear wheel 22, which is the drive wheel.

The front wheel 23 is a steered wheel provided between the front part of the vehicle 20 and the road surface, and the travel direction can be varied by changing the orientation in conjunction with the orientation of the handle bar 20b.

The rear wheel 22 is a drive wheel provided between the road surface and the rear part of the vehicle 20 where the battery packs 10 are installed, and is rotationally driven by the motor 21.

The battery remaining capacity display device 30 calculates and displays the remaining capacity of each battery pack 10.

1-4. Battery Remaining Capacity Display Device 30

The battery remaining capacity display device 30 comprises a plurality of battery information storage components 31, a plurality of remaining capacity calculators 32, a combined remaining capacity calculator 33, a display component 34, a display controller 35, a display instruction component 36, a storage component 37, and an input component 38.

A battery information storage component 31 is provided for each battery pack 10, and stores information such as the current supplied from the battery packs 10, and sums thereof. In this embodiment, since two battery packs 10 are installed in the vehicle 20, the battery remaining capacity display device 30 is provided with two battery information storage components 31. When distinguishing among the two battery information storage sections 31 in this description, they are indicated by 31A and 31B. The battery information storage component 31A stores information from the battery pack 10A, and the battery information storage component 31B stores information from the battery pack 10B.

A remaining capacity calculator 32 is provided for each battery information storage component 31, and calculates the remaining capacity of the battery pack 10 on the basis of the information stored in the battery information storage component 31. Since the battery remaining capacity display device 30 in this embodiment is equipped with two battery information storage sections 31, two remaining capacity calculators 32 are provided. When distinguishing among the two remaining capacity calculators 32 in this description, they are indicated as 32A and 32B. The remaining capacity calculator 32A estimates the remaining capacity of the battery pack 10A on the basis of the information in the battery information storage component 31A. The remaining capacity calculator 32B estimates the remaining capacity of the battery pack 10B on the basis of the information in the battery information storage component 31B.

The combined remaining capacity calculator 33 calculates the combined remaining capacity ratio of the plurality of battery packs 10 by combining the remaining capacities of the battery packs 10 calculated by the respective remaining capacity calculators 32. The following is used as the calculation formula.

Formula 1

$$\text{combined remaining capacity ratio (\%)} = \frac{\text{total remaining capacity}}{\text{total capacity}} \times 100 = \frac{C_{now}}{C_{all}} \times 100$$

$$= \frac{\dfrac{C_{now1}}{C_{all1}} + \dfrac{C_{now2}}{C_{all2}} + \cdots + \dfrac{C_{nown}}{C_{alln}}}{n} \times 100 = \frac{\sum_{k=1}^{n} \dfrac{C_{nowk}}{C_{allk}}}{n} \times 100$$

$C_{now}$: current total remaining capacity of the plurality of batteries
$C_{all}$: total capacity of the plurality of batteries
$C_{now\ n}$: current remaining capacity of the n-th battery
$C_{all i}$: capacity of the n-th battery This calculation formula can be used to calculate the combined remaining capacity ratio when n-number of battery packs 10 are installed. For example, if we let the full charge capacity of the battery packs 10A and 10B be 1.0 kwh, the current remaining capacity of the battery pack 10A be 0.3 kwh, and the remaining capacity of the battery pack 10B be 0.7 kwh, the remaining capacity ratio to the full charge capacity of the battery pack 10A is 0.3 (30%), and the remaining capacity ratio to the full charge capacity of the battery pack 10B is 0.7 (70%). The remaining capacity ratios of the battery packs 10A and 10B are then added and divided by 2, and the quotient is multiplied by 100 to find the combined remaining capacity ratio of the battery packs 10A and 10B to be 50%.

The display controller 35 controls the display component 34 to display the individual remaining capacities of the battery packs 10 calculated by the remaining capacity calculators 32, and the combined remaining capacity ratio calculated by the combined remaining capacity calculator 33.

The storage component 37 stores the remaining capacity of each battery pack 10 calculated by the remaining capacity calculators 32, and the data for the combined remaining capacity calculated by the combined remaining capacity calculator 33.

The display instruction component 36 instructs the display controller 35 to display or not to display the individual remaining capacity ratio, and to display or not to display the combined remaining capacity ratio.

Specifically, the display instruction component 36 gives an instruction for when the individual remaining capacity ratio and the combined remaining capacity ratio are displayed (see the dual display 350 shown in FIG. 3 (discussed below)), or when only the combined remaining capacity ratio is displayed (see the combined remaining capacity display 343 shown in FIG. 4 (discussed below)), or when only the individual remaining capacity ratio is displayed (see the individual remaining capacity display 344 shown in FIG. 5 (discussed below)).

The input component 38 accepts an operation by the user. The display instruction component 36 instructs the display controller 35 to display either the dual display 350, the combined remaining capacity display 343, or the individual remaining capacity display 344, on the basis of the operation to the input component 38 by the user. The input component 38 may be something like a switch, for example, or may be a touch panel or the like. For example, the configuration may be such that each time a switch is pressed, the display is switched between the dual display 350, the combined remaining capacity display 343, and individual remaining capacity display 344, or a switch may be provided for displaying each of these.

The display component 34 is controlled by the display controller 35, and displays the combined remaining capacity of the battery packs 10A and 10B found by the combined remaining capacity calculator 33 and/or the individual remaining capacity ratios (percentage display) of the battery packs 10A and 10B.

Figure 3:
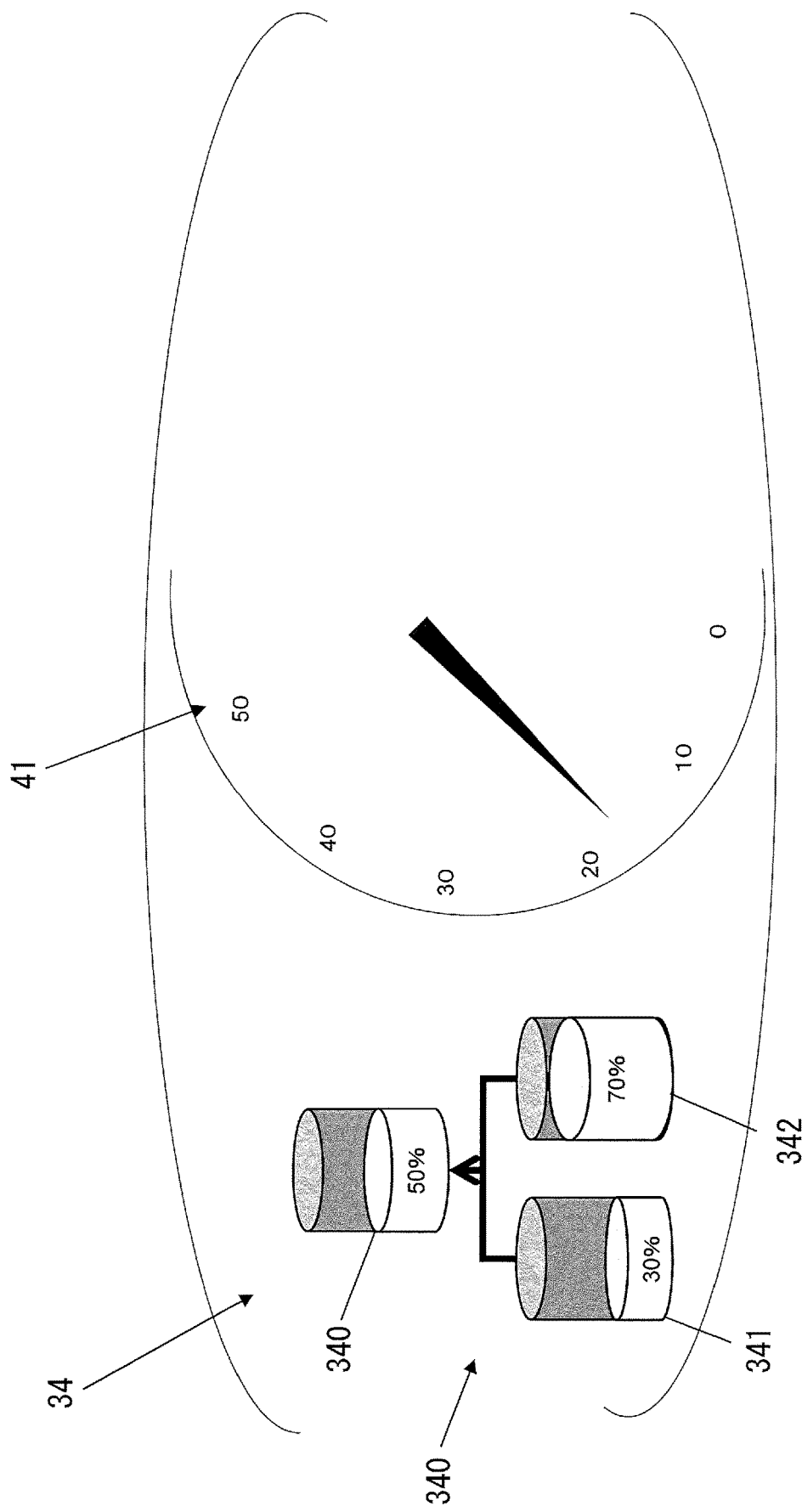
FIG. 3 is a diagram showing an example of dual display by the battery remaining capacity display device in FIG. 2.

FIG. 3 is a diagram showing an example of the display when the individual remaining capacity ratios and the combined remaining capacity ratio are displayed on the display component 34. The display component 34 is provided to the handle bar 20b, and is provided next to a speedometer 41 as shown in FIG. 3. The dual display 350 that shows both the individual remaining capacity ratios and the combined remaining capacity ratio is given on the display component 34. The dual display 350 includes a combined remaining capacity display 340, a first remaining capacity display 341, and a second remaining capacity display 342. The first remaining capacity display 341 shows the remaining capacity ratio of the battery pack 10A, and the above-mentioned 30% is shown as an example here. The second remaining capacity display 342 shows the remaining capacity ratio of the battery pack 10B, and the above-mentioned 70% is shown as an example here.

The combined remaining capacity display 340 shows the combined remaining capacity ratio found by combining the remaining capacity of the battery pack 10A with the remaining capacity of the battery pack 10B. In FIG. 3, the combined remaining capacity display 340 shows the above-mentioned 50% as an example.

Figure 4:
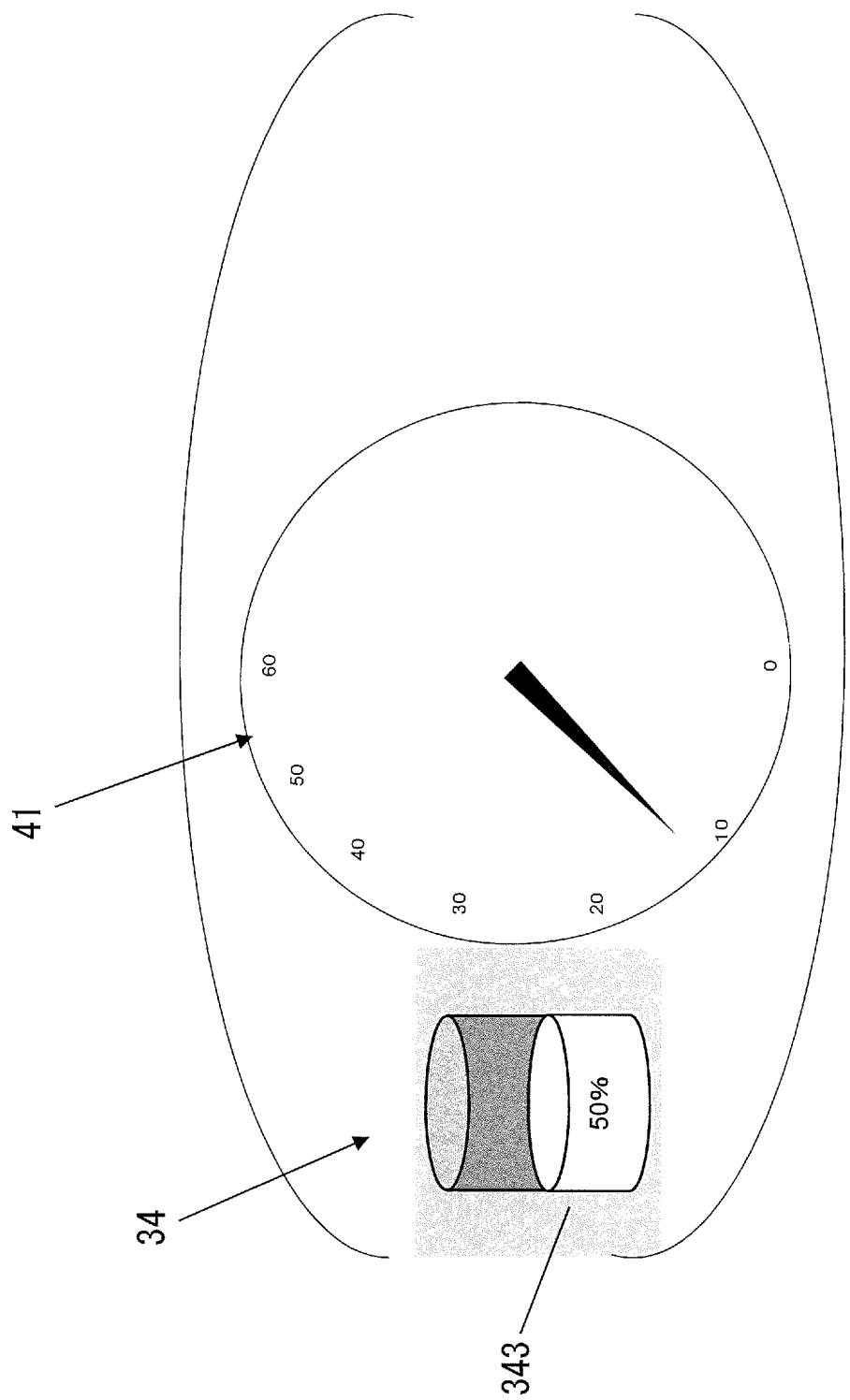
FIG. 4 is a diagram showing an example of a combined remaining capacity display by the battery remaining capacity display device in FIG. 2.

FIG. 4 is a diagram showing an example of the display when the combined remaining capacity ratio is displayed on the display component 34, but the individual remaining capacity ratios are not displayed. As shown in FIG. 4, the combined remaining capacity display 343 of the battery pack 10A and the battery pack 10B is given on the display component 34.

Figure 5:
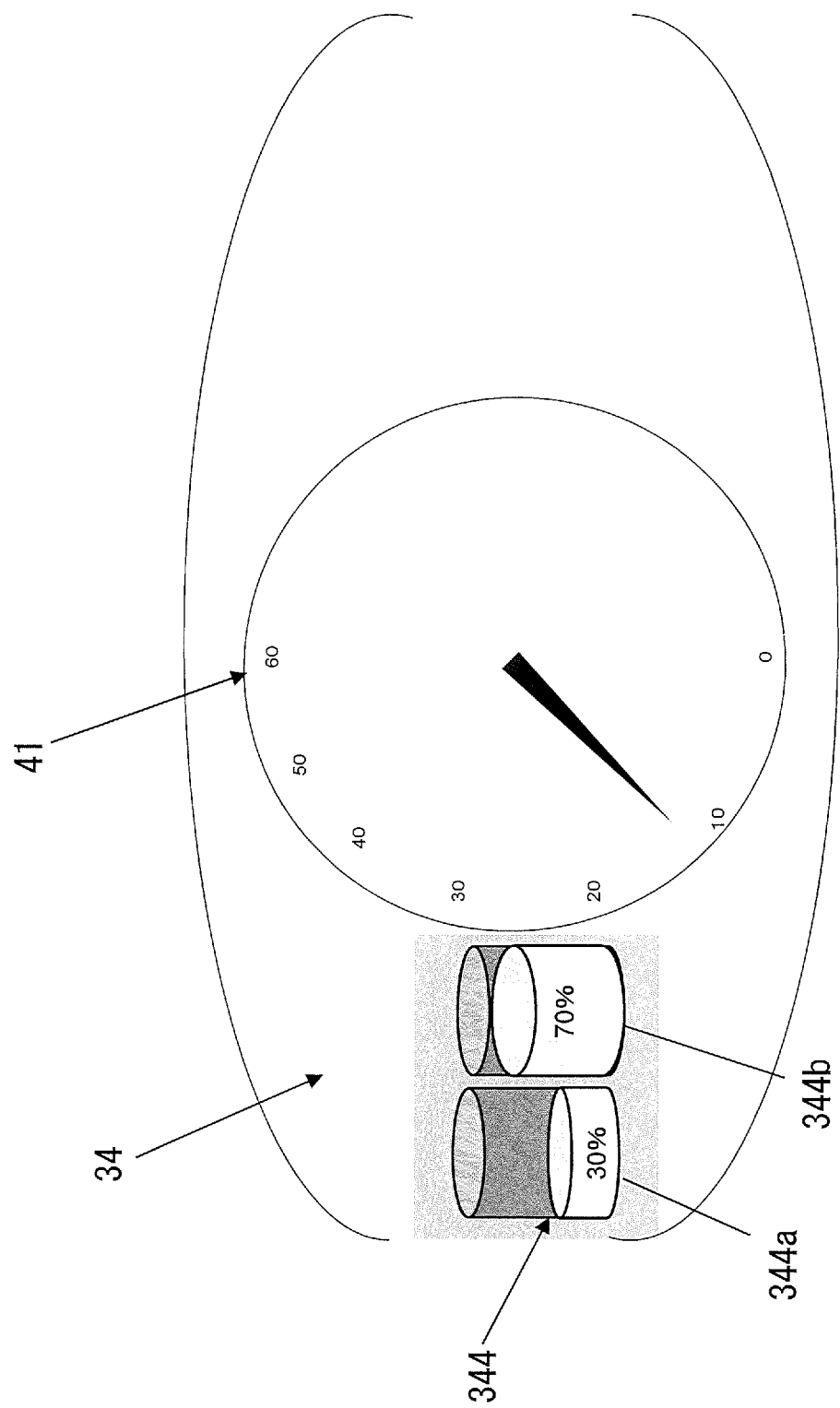
FIG. 5 is a diagram showing an example of an individual remaining capacity display by the battery remaining capacity display device in FIG. 2.
Figure 6:
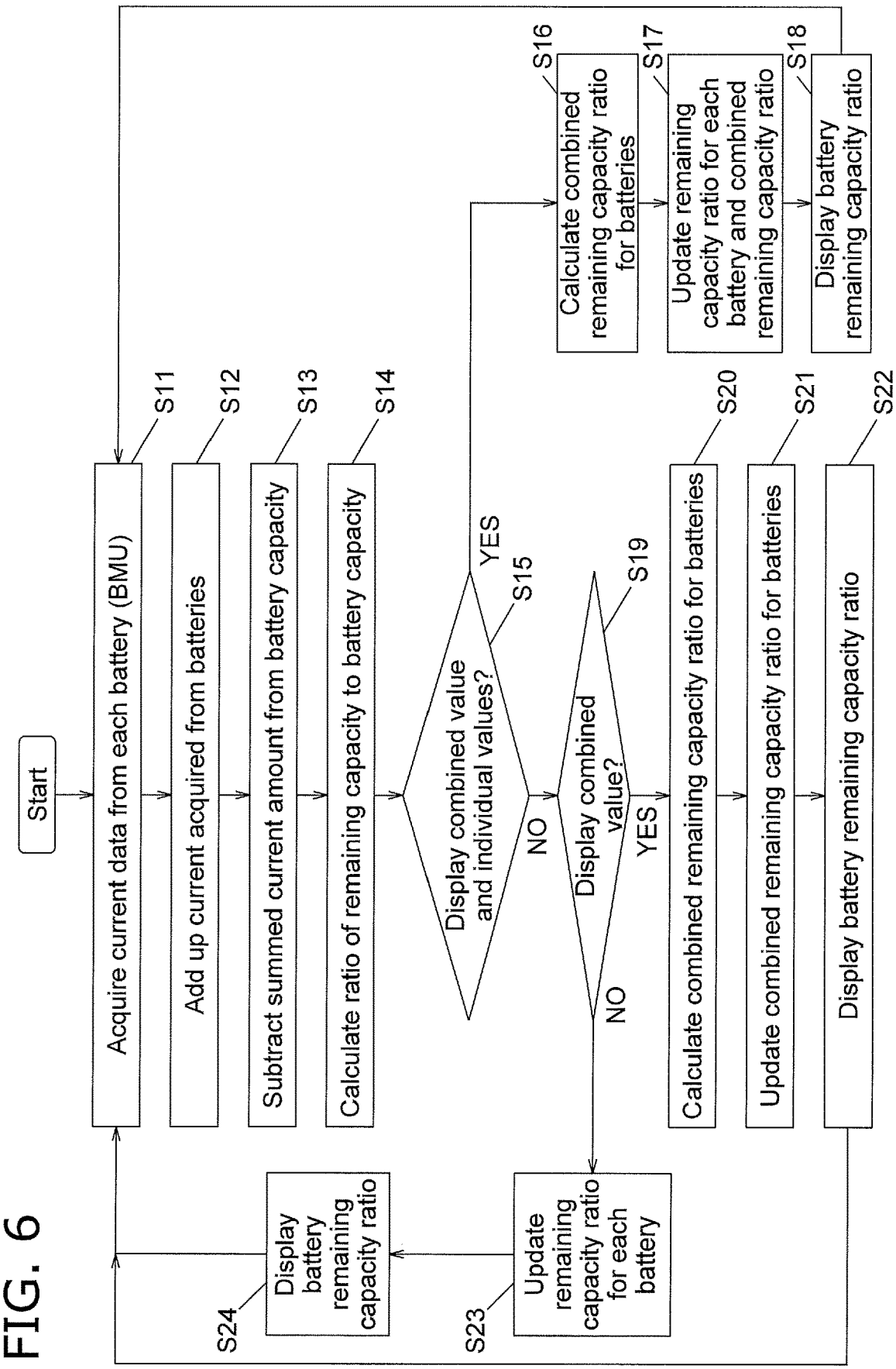
FIG. 6 is a flowchart of the operation of the battery remaining capacity display device in FIG. 2.

FIG. 5 is a diagram showing an example of the display when the individual remaining capacity ratios are displayed on the display component 34, but the combined remaining capacity ratio is not displayed. As shown in FIG. 5, the individual remaining capacity display 344 for the battery pack 10A and the battery pack 10B is given on the display component 34. The individual remaining capacity display 344 shows the remaining capacity of the battery pack 10A in the first remaining capacity display 344a, and the remaining capacity of the battery pack 10B in the second remaining capacity display 344b.

2. Operation

Next, the operation of the battery system 1 in this embodiment will be described, and an example of the battery remaining capacity display method of the present invention will also be discussed at the same time. FIG. 4 is a flowchart of the battery remaining capacity display method.

As shown in FIG. 4, in step S11, electrical current data from the BMU 11A of the battery pack 10A is stored in the battery information storage component 31A, and electrical current data from the BMU 11B of the battery pack 10B is stored in the battery information storage component 31B.

Next, in step S12, the remaining capacity calculator 32A adds up the current on the basis of the current data stored in the battery information storing component 31A, and the remaining capacity calculator 32B adds up the current on the basis of the current data stored in the battery information storing component 31B.

Next, in step S13, the remaining capacity calculator 32A calculates the remaining capacity of the current battery pack 10A by subtracting the summed current amount from the capacity of the battery pack 10A. In the above example, the remaining capacity calculator 32A calculates the remaining capacity of the battery pack 10A to be 0.3 kwh. Also, the remaining capacity calculator 32B calculates the remaining capacity of the current battery pack 10B by subtracting the summed current amount from the capacity of the battery pack 10B. In the above example, the remaining capacity calculator 32B calculates the remaining capacity of the battery pack 10B to be 0.7 kwh.

Next, in step S14, the remaining capacity calculator 32A calculates the ratio of the remaining capacity to the capacity of the battery pack 10A, and the remaining capacity calculator 32B calculates the ratio of the remaining capacity to the capacity of the battery pack 10B. In the above example, the remaining capacity calculator 32A calculates the ratio to be 0.3 (0.3 kwh+1.0 kwh), and the remaining capacity calculator 32B calculates the ratio to 0.7 kwh (0.7 kwh+1.0 kwh). Steps S12 to S14 correspond to an example of the individual remaining capacity calculation step.

Next, in step S15, it is determined whether or not an input has been made on the input component 38 so that the dual display 350 will be given.

Here, if the user has made an input indicating that the dual display 350 is to be given, in step S16 the combined remaining capacity calculator 33 calculates the combined remaining capacity for the battery pack 10A and the battery pack 10B. In the above example, using Formula 1, the ratio (0.3 (30%)) of the remaining capacity to the capacity of the battery pack 10A is added to the ratio (0.7 (70%)) of the remaining capacity to the capacity of the battery pack 10B, and this sum is divided by the number of battery packs 10 (2), which gives a combined remaining capacity ratio (0.5 (50%)). Step S16 corresponds to an example of the combined remaining capacity calculation step.

Next, in step S17, the display controller 35 updates the data for the combined remaining capacity stored in the storage component 37, and the data for the remaining capacity of the battery pack 10A and the remaining capacity of the battery pack 10B stored in the storage component 37.

Next, in step S18, the display controller 35 controls the display component 34 so that the display component 34 gives the dual display 350 (the combined remaining capacity display 340, the first remaining capacity display 341, and the second remaining capacity display 342) on the basis of the data updated in step S17 above. Step S18 corresponds to an example of a display step.

On the other hand, if no input has been made to give the dual display 350 in step S15, in step S19 it is determined whether or not an input to display the combined value has been made on the input component 38.

Here, if the user has inputted a command to display a combined value, in step S20 the combined remaining capacity ratio of the battery packs 10A and 10B is calculated. In step S20, just as in step S16, calculation is performed using Formula 1, and the combined remaining capacity ratio is calculated. Step S20 corresponds to an example of the combined remaining capacity calculation step.

Next, in step S21, the display controller 35 updates the data for the combined remaining capacity stored in the storage component 37 with the data for the combined remaining capacity calculated by the combined remaining capacity calculator 33. Then, in step S22, the display controller 35 causes the display component 34 to display the combined remaining capacity display 343 (see FIG. 4) on the basis of the updated data for the combined remaining capacity ratio. Step S22 corresponds to an example of a display step.

On the other hand, in step S19, if no command to display a combined value on the input component 38 has been inputted (or, to put this another way, if a command to display the individual remaining capacity has been inputted), in step S23 the display controller 35 updates the data for the individual remaining capacities of the battery packs 10A and 10B stored in the storage component 37 on the basis of the data for the individual remaining capacities calculated by the remaining capacity calculators 32A and 32B.

Next, in step S24, the display controller 35 causes the display component 34 to display the individual remaining capacity display 344 (see FIG. 5) on the basis of the updated data for the remaining capacity ratio. Step S24 corresponds to an example of a display step.

With the power to the vehicle 20 on, steps S11 to S24 are repeated, and the dual display 350, the combined remaining capacity display 343, and the individual remaining capacity display 344 show the combined remaining capacity ratio and the individual remaining capacity ratios of the battery packs 10A and 10B at the current time.

When the power to the vehicle 20 is switched off, display control of the battery remaining capacity ends.

3. Features, Etc.

(3-1)

The battery remaining capacity display device 30 in this embodiment comprises the remaining capacity calculators 32A and 32B, the combined remaining capacity calculator 33, the display controller 35, the display instruction component 36, and the display component 34. The remaining capacity calculators 32A and 32B calculate the individual remaining capacities of the battery packs 10A and 10B, which can be removably connected in parallel to the vehicle 20. The combined remaining capacity calculator 33 calculates the combined remaining capacity ratio of the battery packs 10A and 10B on the basis of the individual remaining capacities calculated by the remaining capacity calculators 32A and 32B. The display controller 35 controls the display of the individual remaining capacities and the display of the total remaining capacity. The display instruction component 36 instructs the display controller 35 to display or not to display. The display component 34 displays the individual remaining capacities and the combined remaining capacity (an example of the total remaining capacity). The display controller 35 controls the display component 34 to display the individual remaining capacities and/or the combined remaining capacity according to an instruction from the display instruction component 36.

Thus, the individual remaining capacities of the battery packs 10A and 10B are acquired, the combined remaining capacity ratio is calculated, and the combined remaining capacity ratio is displayed, which makes it easy for the user to determine how far can be traveled from the current location.

Also, displaying the individual remaining capacities of the battery packs 10A and 10B allows the user to easily tell which of the battery packs 10A and 10B needs to be replaced.

Also, for example, displaying the total of the battery packs 10A and 10B as a percentage makes it possible to confirm percentage of the total remaining capacity with respect to the total amount, and how far can be traveled can be determined more intuitively.

Also, for example, since the individual remaining capacity ratios can be displayed along with the combined remaining capacity ratio, as shown in the dual display 350, when replacing the battery packs 10 at the station 100, the user can easily tell which of the plurality of battery packs 10 have a low remaining capacity. Also, since the combined remaining capacity ratio is also displayed, the user can intuitively grasp how far can be traveled from the current location.

Also, for example, the display can be switched between the individual remaining capacities and the combined remaining capacity.

(3-2)

The battery remaining capacity display device 30 in this embodiment further comprises the input component 38 that accepts an operation from the user. The display instruction component 36 instructs the display controller 35 to switch between a display of the individual remaining capacities and a display of the combined remaining capacity on the basis of user operation of the input component 38.

This makes it possible to switch between an individual remaining capacity display and a combined remaining capacity display on the basis of the user setting.

Also, while the vehicle is traveling, the combined remaining capacity ratio can be displayed, and the individual remaining capacity ratios can be displayed when the battery packs 10 are being replaced at the station 100.

Therefore, the user can easily tell which battery packs 10 to exchange at the station 100, and can also intuitively grasp how far can be traveled.

(3-3)

With the battery remaining capacity display device 30 in this embodiment, the vehicle 20 is an electric motorcycle or an electric bicycle.

Here, the vehicle 20 is a vehicle including electric motorcycles and electric bicycles.

Consequently, the remaining capacity of each battery pack 10 in the vehicle 20 in which the battery packs 10A and 10B are installed can be calculated, and the combined remaining capacity can be displayed.

(3-4)

The battery system 1 in this embodiment comprises the plurality of battery packs 10, the remaining capacity calculators 32A and 32B, the combined remaining capacity calculator 33, the display controller 35, the display instruction component 36, and the display component 34. The battery packs 10 can be removably connected in parallel in the vehicle 20. The remaining capacity calculators 32A and 32B calculate the individual remaining capacities of the battery packs 10A and 10B that can be removably connected in parallel in the vehicle 20. The combined remaining capacity calculator 33 calculates the combined remaining capacity ratio of the battery packs 10A and 10B on the basis of the individual remaining capacities calculated by the remaining capacity calculators 32A and 32B. The display controller 35 controls the display of the individual remaining capacities and the display of the total remaining capacity. The display instruction component 36 instructs the display controller 35 to display or not to display. The display component 34 displays the individual remaining capacities and the total remaining capacity. The display controller 35 controls the display component 34 to display individual remaining capacities and/or the total remaining capacity according to an instruction from the display instruction component 36.

Consequently, the battery system 1 can acquire the remaining capacity for each of the battery packs 10A and 10B, and display the combined remaining capacity ratio.

(3-5)

The batter remaining capacity display method in Embodiment 1 comprises steps S12 to S14 (an example of an individual remaining capacity calculation step), steps S16 and S20 (an example of a total remaining capacity calculation step), steps S15 and S19 (an example of a display instruction step), steps S18, S22, and S24 (an example of a display control step and a display step). Steps S12 to S14 involve calculating the remaining capacity for each of the battery packs 10A and 10B that can be removably connected in parallel in the vehicle 20. Steps S16 and S20 involve calculating the combined remaining capacity ratio for the battery packs 10A and 10B on the basis of the individual remaining capacities of the battery packs 10A and 10B calculated in steps S12 to S14. Steps S15 and S19 involve giving an instruction to display or not to display the individual remaining capacities and the total remaining capacity. Steps S18, S22, and S24 involve controlling the display of the individual remaining capacities and the display of the total remaining capacity according to the instruction from steps S15 and S19, and displaying the individual remaining capacities and/or the total remaining capacity based on this control.

Thus calculating the total remaining capacity from the individual remaining capacities of the battery packs 10A and 10B, and displaying this total remaining capacity makes it easy for the user to tell how far can be traveled from the current location. Also, displaying the individual remaining capacities of the plurality of battery packs 10 allows the user to easily grasp which battery packs 10 need to be exchanged.

4. Other Embodiments

An embodiment of the present invention was described above, but the present invention is not limited to or by the above embodiment, and various modifications are possible without departing from the gist of the invention.

(A)

In the above embodiment, the display on the display component 34 was switched between the dual display 350, the combined remaining capacity display 343, and the individual remaining capacity display 344, but the dual display 350 may not be displayed, and the display on the display component 34 may be switched between just the combined remaining capacity display 343 and the individual remaining capacity display 344 with the input component 38.

(B)

In the above embodiment, the remaining capacities of the battery packs 10A and 10B were displayed as a percentage, but this is not the only option. The present remaining capacity values (in the example in FIG. 3, 0.3 kwh and 0.7 kwh) may be displayed, or the full charge capacity may be displayed along with the present remaining capacity values. Also, as the total remaining capacity, the combined remaining capacity was displayed as a ratio by looking at the plurality of battery packs 10 as a single battery pack 10, but the total of the remaining capacity values (in the example in FIG. 3, 1.0 kwh) may be displayed, or the total of the full charge capacities of the battery packs 10A and 10B (in the example in FIG. 3, 2.0 kwh) may be displayed along with the present total of the remaining capacity values.

In short, what is important is that the user can check the total remaining capacities of the plurality of battery packs 10, and that the user can check the remaining capacity of each of the plurality of battery packs 10.

(C)

In the above embodiment, the battery remaining capacity display device 30 calculated the remaining capacities of the battery packs 10A and 10B, but these remaining capacities may be calculated in the battery packs 10A and 10B and sent to the battery remaining capacity display device 30. That is, a capacitor (corresponds to an example of a battery) and an individual remaining capacity calculator that calculates the remaining capacity of the capacitor may be provided to each of the battery packs 10A and 10B. In this case, the battery remaining capacity display device 30 need not be provided with the battery information storage components 31A and 31B or the remaining capacity calculators 32A and 32B.

(D)

In the above embodiment, the display instruction component 36 switched the display component 34 between the combined remaining capacity display 343 and the individual remaining capacity display 344 on the basis of user input to the input component 38, but, for example, the display instruction component 36 may be incorporated into a navigation system or the like, and control may be performed so that the combined remaining capacity display 343 is given while the vehicle is traveling, and the individual remaining capacity display 344 is given when the vehicle is close to arriving at the station 100.

(E)

In the above embodiment, two battery packs 10 were provided, but the number is not limited to two, and three or more battery packs 10 may be provided. In this case, the number of displays of the individual remaining capacity shown in FIGS. 3 and 7 increases according to the number of battery packs 10.

(F)

In the above embodiment, an electric motorcycle was described as the power consumption element, for example, but it may be an electric bicycle, an electrically assisted bicycle, an electric unicycle, an electric automobile (EV), a PHV (plug-in hybrid vehicle), or some other such vehicle.

Furthermore, the power consumption element may be a drill or another such electric power tool, for example.

INDUSTRIAL APPLICABILITY

The battery remaining capacity display device, battery system, and battery remaining capacity display method of the present invention have the effect of allowing the user to easily grasp how far can be traveled, and can be widely applied to vehicles driven by replaceable batteries.

REFERENCE SIGNS LIST

1: battery system
10, 10A, 10B: battery pack (an example of a battery)
11A, 11B: BMU
20: vehicle (an example of a power consumption element)
20a: seat
20b: handle bar
21: motor
22: rear wheel
23: front wheel
30: battery remaining capacity display device
31, 31A, 31B: battery information storage component
32, 32A, 32B: remaining capacity calculator (an example of an individual remaining capacity calculator)
33: combined remaining capacity calculator (an example of a total remaining capacity calculator)
34: display component
35: display controller
36: display instruction component
37: storage component
38: input component
41: speedometer
100: station
100a: receptacle
340: combined remaining capacity display
341: first remaining capacity display
342: second remaining capacity display
343: combined remaining capacity display
344: individual remaining capacity display
344a: first remaining capacity display
344b: second remaining capacity display
350: dual display

The invention claimed is:

1. A battery remaining capacity display device, comprising:
an individual remaining capacity calculator that calculates individual remaining capacities of a plurality of batteries that are removably connected in parallel to a power consumption element;
a total remaining capacity calculator that calculates total remaining capacity of the plurality of batteries on the basis of the individual remaining capacities calculated by the individual remaining capacity calculator;
a display controller that controls display of the individual remaining capacities and display of the total remaining capacity;
a display instruction component that instructs the display controller either to display or not to display; and
a display component that displays the individual remaining capacities and the total remaining capacity,
wherein the display controller controls so that the individual remaining capacities and/or the total remaining capacity is displayed on the display component according to an instruction from the display instruction component, and
the display instruction component instructs the display controller to display only the total remaining capacity without displaying the individual remaining capacities on the display component during drive of the power consumption element, and to display only the individual remaining capacities without displaying the total remaining capacity on the display component during battery exchange by switching between the display of the individual remaining capacities and the display of the total remaining capacity.

2. The battery remaining capacity display device according to claim 1,
wherein the display instruction component instructs the display controller to switch the display of the individual remaining capacities and the display of the total remaining capacity on the basis of a user setting.

3. The battery remaining capacity display device according to claim 1,
further comprising an input component that accepts an operation from a user,
wherein the display instruction component instructs to switch the display of the individual remaining capacities and the display of the total remaining capacity on the basis of a user operation to the input component.

4. The battery remaining capacity display device according to claim 1,
wherein the power consumption element is an electric motorcycle, an electric bicycle, an electrically assisted bicycle, or an electric power tool.

5. A battery system, comprising:
a plurality of batteries that are removably connected in parallel to a power consumption element;
an individual remaining capacity calculator that calculates individual remaining capacities of the plurality of batteries;
a total remaining capacity calculator that calculates total remaining capacity of the plurality of batteries on the basis of the individual remaining capacities calculated by the individual remaining capacity calculator;
a display controller that controls display of the individual remaining capacities and display of the total remaining capacity;
a display instruction component that instructs the display controller either to display or not to display; and
a display component that displays the individual remaining capacities and the total remaining capacity,
wherein the display controller controls so that the individual remaining capacities and/or the total remaining capacity is displayed on the display component according to an instruction from the display instruction component, and
the display instruction component instructs the display controller to display only the total remaining capacity without displaying the individual remaining capacities on the display component during drive of the power consumption element, and to display only the individual remaining capacities without displaying the total remaining capacity on the display component during battery exchange by switching between the display of the individual remaining capacities and the display of the total remaining capacity.

6. A remaining battery capacity display method, comprising:
an individual remaining capacity calculation step of calculating individual remaining capacities of a plurality of batteries that are removably connected in parallel to a power consumption element;

a total remaining capacity calculation step of calculating total remaining capacity of the plurality of batteries on the basis of the individual remaining capacities calculated in the individual remaining capacity calculating step;

a display instruction step of instructing whether to display or not display the individual remaining capacities and the total remaining capacity;

a display control step of controlling display of the individual remaining capacities and display of the total remaining capacity according to an instruction from the display instruction step; and a display step of displaying the individual remaining capacities and/or the total remaining capacity on the basis of control performed in the display control step, wherein in the display control step, an instruction to display only the total remaining capacity without displaying the individual remaining capacities during drive of the power consumption element and to display only the individual remaining capacities without displaying the total remaining capacity during battery exchange is performed switching between the display of the individual remaining capacities and the display of the total remaining capacity.

* * * * *